US012748205B2

(12) United States Patent
Kim et al.

(10) Patent No.: US 12,748,205 B2
(45) Date of Patent: Sep. 29, 2026

(54) POSITIONING METHOD USING WIRELESS COMMUNICATION, AND ELECTRONIC DEVICE FOR SUPPORTING SAME

(71) Applicant: SAMSUNG ELECTRONICS CO., LTD., Suwon-si (KR)

(72) Inventors: Hyunchul Kim, Suwon-si (KR); Yi Yang, Suwon-si (KR); Moonseok Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 250 days.

(21) Appl. No.: 18/615,304

(22) Filed: Mar. 25, 2024

(65) Prior Publication Data

US 2024/0230884 A1 Jul. 11, 2024

Related U.S. Application Data

(63) Continuation of application No. PCT/KR2022/008753, filed on Jun. 21, 2022.

(30) Foreign Application Priority Data

Oct. 1, 2021 (KR) ........................ 10-2021-0130995
Dec. 2, 2021 (KR) ........................ 10-2021-0171130

(51) Int. Cl.
*G01S 13/87* (2006.01)
*G01S 13/76* (2006.01)

(52) U.S. Cl.
CPC .......... *G01S 13/876* (2013.01); *G01S 13/765* (2013.01)

(58) Field of Classification Search
CPC ............................ G01S 13/876; G01S 13/765
(Continued)

(56) References Cited

U.S. PATENT DOCUMENTS 10,028,105 B1 * 7/2018 Swart ........................ G01S 5/14
11,137,491 B2 10/2021 Kim
(Continued)

FOREIGN PATENT DOCUMENTS

CN 113009461 A 6/2021
EP 3700234 A1 8/2020
(Continued)

OTHER PUBLICATIONS

International Search Report for PCT/KR2022/008753 mailed Oct. 6, 2022, 5 pages.
(Continued)

*Primary Examiner* — Samarina Makhdoom
(74) *Attorney, Agent, or Firm* — NIXON & VANDERHYE P.C.

(57) ABSTRACT

An electronic device according to an embodiment of the disclosure may include: a communication circuit, and at least one processor, comprising processing circuitry, electrically coupled to the communication circuit. At least one processor, individually and/or collectively, may be configured to: receive via the communication circuit an advertising frame transmitted by a first external electronic device, transmit a first request signal, requesting a second external electronic device to receive the advertising frame from the first external electronic device, to the second external electronic device via the communication circuit in response to receiving the advertising frame from the first external electronic device, obtain advertisement result response data, including first timestamp information on a timing at which the second external electronic device receives the advertising frame transmitted by the first external electronic device, from the second external electronic device via the communication circuit, obtain location data including location information of the second external electronic device with
(Continued)

respect to the electronic device, based on performing ranging using Ultra-Wideband (UWB) communication with the second external electronic device, and identify a location of the first external electronic device with respect to the electronic device, based on the advertisement result response data and the location data.

17 Claims, 8 Drawing Sheets

(58) Field of Classification Search
USPC .......................................................... 342/125
See application file for complete search history.

(56) References Cited

U.S. PATENT DOCUMENTS

| | | | | |
|---|---|---|---|---|
| 2018/0003827 | A1* | 1/2018 | Farrokhi | G01S 19/21 |
| 2018/0091965 | A1* | 3/2018 | Watson | H04W 8/005 |
| 2019/0195981 | A1 | 6/2019 | Ding et al. | |
| 2020/0128620 | A1 | 4/2020 | Han | |
| 2020/0204656 | A1 | 6/2020 | Lee | |
| 2020/0367016 | A1 | 11/2020 | Jung | |
| 2021/0006652 | A1 | 1/2021 | Ledvina | |
| 2021/0014677 | A1* | 1/2021 | Han | H04W 4/70 |
| 2021/0072373 | A1* | 3/2021 | Schoenberg | G01S 13/878 |
| 2021/0092703 | A1 | 3/2021 | Min | |

FOREIGN PATENT DOCUMENTS

| | | | |
|---|---|---|---|
| JP | 2014184909 | A | 10/2014 |
| KR | 101702261 | B1 | 2/2017 |
| KR | 101936112 | B1 | 1/2019 |
| KR | 20190120114 | A | 10/2019 |
| KR | 20200044505 | A | 4/2020 |
| KR | 20200079083 | A | 7/2020 |
| KR | 20200131037 | A | 11/2020 |
| KR | 20210034270 | A | 3/2021 |

OTHER PUBLICATIONS

Written Opinion of the ISA for PCT/KR2022/008753 mailed Oct. 6, 2022, 3 pages.

* cited by examiner

POSITIONING METHOD USING WIRELESS COMMUNICATION, AND ELECTRONIC DEVICE FOR SUPPORTING SAME

CROSS-REFERENCE TO RELATED APPLICATIONS

This application is a continuation of International Application No. PCT/KR2022/008753 designating the United States, filed on Jun. 21, 2022, in the Korean Intellectual Property Receiving Office and claiming priority to Korean Patent Application Nos. 10-2021-0130995, filed on Oct. 1, 2021, and 10-2021-0171130, filed on Dec. 2, 2021, in the Korean Intellectual Property Office, the disclosures of each of which are incorporated by reference herein in their entireties.

BACKGROUND

Field

The disclosure relates to a technique for positioning an external electronic device using wireless communication.

Description of Related Art

Recently, the rapid development of wireless communication systems leads to a growing demand for services using wireless communication and an increasing spread of electronic devices including wireless communication modules. An electronic device supporting Ultra-Wideband (UWB) communication among various wireless communication schemes may provide a precise positioning function. For example, the electronic device may measure a location of an external electronic device through a ranging operation using the UWB communication, and may control the function of the external electronic device, based on the measured location of the external electronic device, or may provide a specified location-based service to the external electronic device.

Devices which support the UWB communication include a device which periodically broadcasts a UWB signal to provide a specific service or information to a peripheral device. For example, the device may be referred to as an advertiser, and the UWB signal transmitted by the advertiser may be referred to as an advertising frame. A user may selectively receive and use an advertising message intended by the user, through a pointing operation for indicating the advertiser to the electronic device such as a mobile device.

According to the conventional technique, when the electronic device receives the advertising frame transmitted by the advertiser, the electronic device may have difficulty in identifying a location of the advertiser. The electronic device may measure a distance between the electronic device and the advertiser when a session for ranging is created between the electronic device and the advertiser. However, since an additional session is created, overhead may be increase.

SUMMARY

Embodiments of the disclosure provide an electronic device that may measure the distance to the advertiser and the location of the advertiser without having to create the additional session with the advertiser.

An electronic device according to an example embodiment of the disclosure may include: a communication circuit, and at least one processor, comprising processing circuitry, electrically coupled to the communication circuit. At least one processor, individually and/or collectively, may be configured to: receive via the communication circuit an advertising frame transmitted by a first external electronic device, transmit a first request signal, requesting a second external electronic device to receive the advertising frame from the first external electronic device, to the second external electronic device via the communication circuit in response to receiving the advertising frame from the first external electronic device, obtain advertisement result response data, including first timestamp information on a timing at which the second external electronic device receives the advertising frame transmitted by the first external electronic device, from the second external electronic device via the communication circuit, obtain location data including location information of the second external electronic device with respect to the electronic device, based on performing ranging using Ultra-Wideband (UWB) communication with the second external electronic device, and identify a location of the first external electronic device with respect to the electronic device, based on the advertisement result response data and the location data.

A method of operating an electronic device according to an example embodiment of the disclosure may include: receiving an advertising frame transmitted by a first external electronic device, transmitting a first request signal, requesting a second external electronic device to receive the advertising frame from the first external electronic device, to the second external electronic device in response to receiving the advertising frame from the first external electronic device, receiving advertisement result response data, including first timestamp information on a timing at which the second external electronic device receives the advertising frame transmitted by the first external electronic device, from the second external electronic device, obtaining location data including location information of the second external electronic device with respect to the electronic device, based on performing ranging using Ultra-Wideband (UWB) communication with the second external electronic device, and identifying a location of the first external electronic device with respect to the electronic device, based on the advertisement result response data and the location data.

An electronic device according to an example embodiment of the disclosure may include: a communication circuit configured to support Ultra-Wideband (UWB) communication and at least one processor, comprising processing circuitry, electrically coupled to the communication circuit. At least one processor, individually and/or collectively, may be configured to: receive a first request signal, requesting to receive an advertising frame transmitted by a second external electronic device, from the first external electronic device via the communication circuit, create an advertisement reception session in response to receiving the first request signal, receive the advertising frame transmitted by the second external electronic device through the advertisement reception session, and transmit advertisement result response data, including first timestamp information on a timing at which the advertising frame is received, to the first external electronic device via the communication circuit.

According to various example embodiments of the disclosure, an electronic device may identify a location of an advertiser with respect to the electronic device in a state where an additional ranging session is not established with the advertiser. For example, the electronic device may identify a distance to the advertiser without having to establish the additional ranging session.

In addition, advantages acquired in the disclosure are not limited to the aforementioned advantages, and other advantages not mentioned herein may be clearly understood one skilled in the art to which the disclosure pertains from the following descriptions.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to the description of the drawings, the same or similar reference numerals may be used to refer to the same or similar elements.

DETAILED DESCRIPTION

Hereinafter, various example embodiments of the disclosure are disclosed with reference to the accompanying drawings. However, it should be appreciated that this is not intended to limit the technological features set forth herein to particular embodiments and include various modifications, equivalents, and/or alternatives for embodiments of the disclosure.

Figure 1:
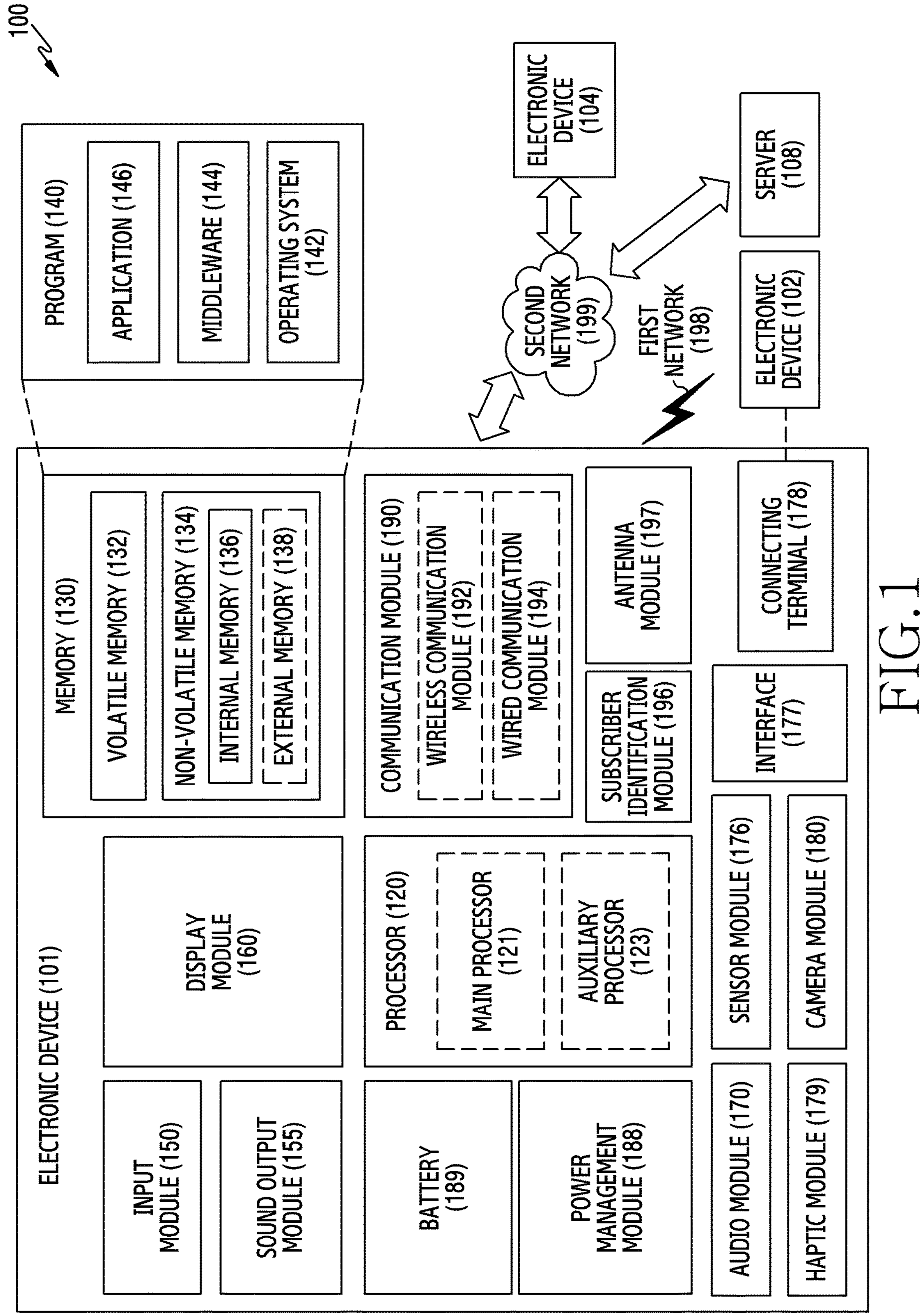
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
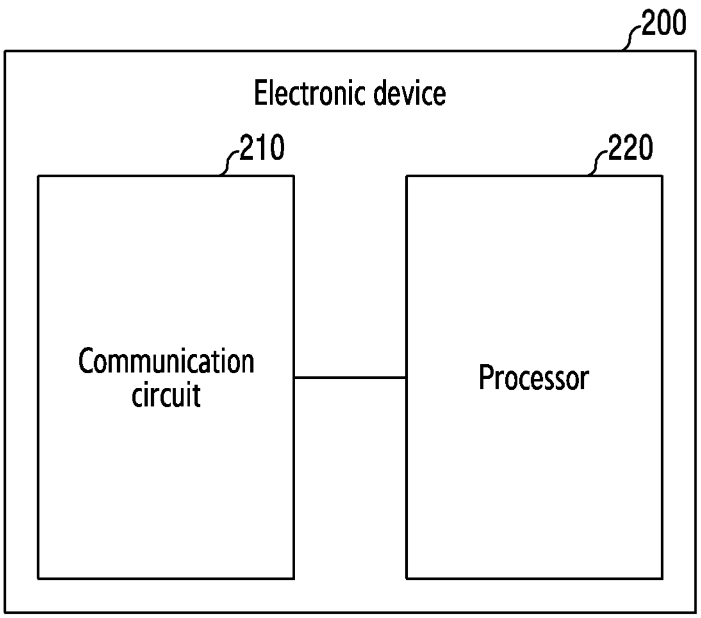
FIG. 2 is a block diagram illustrating an example configuration of an electronic device according to various embodiments.

FIG. 2 is a block diagram illustrating an example configuration of an electronic device 200 according to various embodiments.

The electronic device 200 according to an embodiment (e.g., the electronic device 101 of FIG. 1) may include a communication circuit 210 (e.g., the communication module 190 of FIG. 1) and a processor (e.g., including processing circuitry) 220 (e.g., the processor 120 of FIG. 1). However, the structure of the electronic device 200 is not limited thereto. According to various embodiments, the electronic device 200 may include at least one different component other than the aforementioned components. For example, the electronic device 200 may further include an antenna (e.g., the antenna module 197 of FIG. 1).

According to an embodiment, the communication circuit 210 may support communication between the electronic device 200 and an external electronic device. For example, the communication circuit 210 may establish wireless communication (e.g., Ultra-Wideband (UWB) communication) with the external electronic device according to a specified communication protocol, and may transmit/receive a signal or data using a frequency band supported by the wireless communication. The communication circuit 210 may support establishment of a UWB communication channel (or a UWB session) corresponding to a frequency band (e.g., 3 GHz band (e.g., about 3.735 GHz to 4.8 GHZ), 6 GHz band (e.g., about 6.0 GHz to 7.2 GHZ), and/or 7 GHz band (e.g., about 7.2 GHz to 10.2 GHZ)) designated to be used UWB communication, among bands to be used in wireless communication with the external electronic device (e.g., the electronic device 102 of FIG. 1). The communication circuit 210 may support UWB communication with the external electronic device through the UWB communication channel. In transmission, the communication circuit 210 may convert a baseband signal generated by the processor 220 (e.g., an application processor and/or the communication processor) into a Radio Frequency (RF) signal of a UWB band and transmit it to the outside through an antenna. In reception, the communication circuit 210 may obtain the RF signal of the UWB band through the antenna (e.g., UWB antenna), and may convert the obtained RF signal into a baseband signal and transmit it to the processor 220.

According to an embodiment, the communication circuit 210 may support Out Of Band (OOB) (e.g., Bluetooth Low Energy (BLE)) communication between the electronic device 200 and the external electronic device. For example, the communication circuit 210 may establish wireless communication according to a BLE communication protocol with respect to the external electronic device, and may transmit/receive a signal or data with respect to the external electronic device using a frequency band supported by the wireless communication.

According to an embodiment, the processor 220 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 220 may, for example, control at least one different component of the electronic device 200, and may perform various data processing or computations. According to an embodiment, the processor 220 may execute instructions for controlling operations of the communication circuit 210. In an embodiment, the processor 220 may perform at least one of the operations. According to an embodiment, it may be understood that operations described as being performed by the electronic device 200 in the disclosure are performed by the processor 220.

According to an embodiment, it may be understood that the processor 220 includes a UWB chip. For example, the processor 220 (e.g., the UWB chip) may perform a switching operation between a session for receiving an advertising frame and a session for ranging of the external electronic device.

According to an embodiment, the electronic device 200 may further include an antenna. The antenna may transmit/receive a signal or data with respect to the external electronic device. According to an embodiment, the antenna may include a plurality of antennas. Among the plurality of antennas, at least one antenna suitable for a communication scheme used in a short-range communication network or a long-range communication network may operate by being selected by the communication circuit 210 (or the processor 220). According to an embodiment, the antenna may include an antenna for transmitting at least one RF signal and an antenna for receiving at least one RF signal. As another example, the antenna may include at least one antenna for transmitting/receiving RF signals. According to an embodiment, the antenna may receive a UWB signal (an RF signal of a UWB band) and/or a BLE signal from the external electronic device, or may transmit the UWB signal and/or the BLE signal to the external electronic device.

Figure 3:
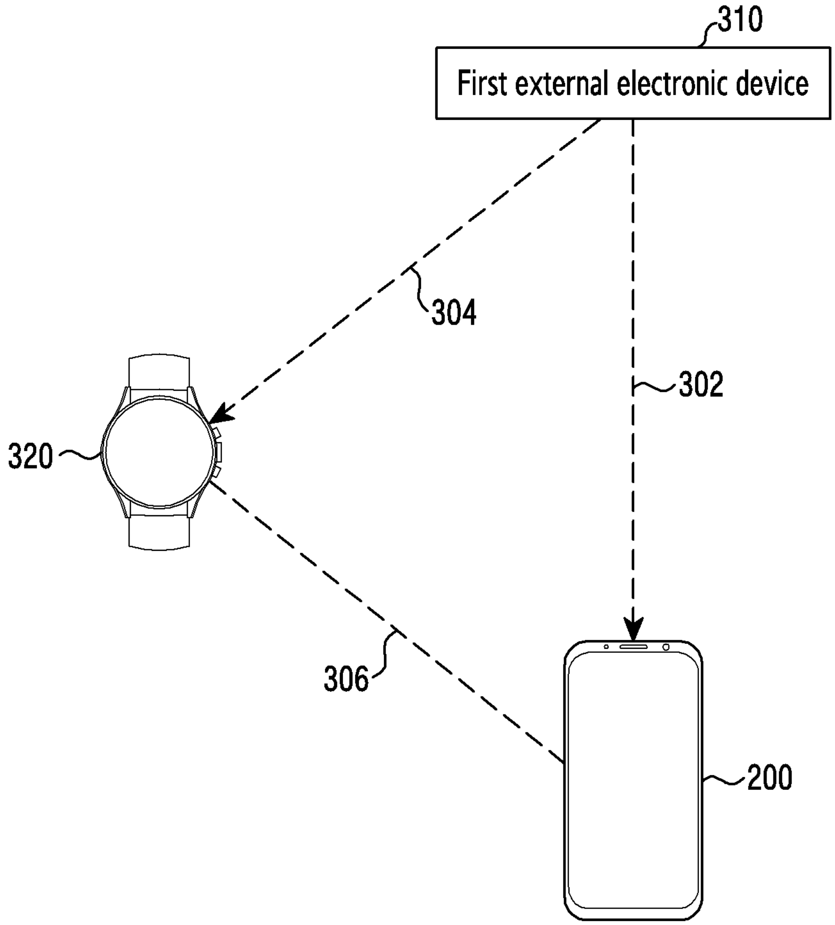
FIG. 3 is a diagram an example of an electronic device, a first external electronic device, and a second external electronic device according to various embodiments.

FIG. 3 is a diagram illustrating an example of the electronic device 200, the first external electronic device 310, and the second external electronic device 320 according to various embodiments.

Referring to FIG. 3, although it is illustrated that the electronic device 200 is a mobile phone, in addition thereto, the electronic device 200 may be various devices such as a mobile device, a tablet, or a laptop computer. However, it will be understood that the disclosure is not limited thereto.

According to an embodiment, the communication circuit 210 of the electronic device 200 may support communication with a first external electronic device 310 and/or a second external electronic device 320. For example, the communication circuit 210 may receive data from the first external electronic device 310 using UWB communication (e.g., OOB (e.g., BLE) communication). As another example, the communication circuit 210 may transmit/receive data with respect to the second external electronic device 320 using UWB communication (or OOB (e.g., BLE) communication).

According to an embodiment, the first external electronic device 310 may transmit an advertising frame. For example, the first external electronic device 310 may be an advertiser which periodically broadcasts the advertising frame. According to an embodiment, the first external electronic device 310 may transmit the advertising frame to provide a specific service or information to peripheral devices. The electronic device 100 may receive the advertising frame transmitted by the first external electronic device 310, and if a specified condition is satisfied, may perform an operation corresponding to the advertising frame. For example, the electronic device 200 may provide a user with information (e.g., an advertising message) corresponding to the advertising frame (e.g., may display the information on a display).

According to an embodiment, although it is illustrated that the second external electronic device 320 is a smart watch, this is one example, and various electronic devices are possible in addition to the smart watch. For example, and without limitation, the second external electronic device 320 may include a wearable electronic device, a laptop, a tablet, or a Personal Computer (PC) which supports UWB communication to transmit/receive data with respect to the first external electronic device 310 and/or the electronic device 200.

According to an embodiment, the second external electronic device 320 may include a processor and a communication circuit. The processor may perform operations described with reference to FIG. 5 to FIG. 7. The processor may transmit/receive data with respect to the electronic device 200 via the communication circuit. It may be understood that operations described as being performed by the second external electronic device 320 in the disclosure may be performed by a processor included in the second external electronic device 320.

According to an embodiment, the electronic device 200 may receive an advertising frame transmitted by the first external electronic device 310 via a first communication path 302. In addition, the second external electronic device 320 may receive an advertising frame transmitted by the first external electronic device 310 via a second communication path 304. According to an embodiment, the first communication path 302 and the second communication path 304 may be unilateral communication paths directed from the first external electronic device 310 to the electronic device 200 and the second external electronic device 320, respectively. That is, the first external electronic device 310 may only transmit the advertising frame to the peripheral devices (e.g., the electronic device 200, the second external electronic device 320), and may not receive data from the peripheral devices. According to an embodiment, the first external electronic device 310 may further create a separate session capable of transmitting/receiving data with respect to the electronic device 200. Although it is illustrated in FIG. 3 that the first communication path 302 and the second communication path 304 are separate communication paths, this is for convenience of explanation, and it may indicate that an advertising frame broadcast by the first external electronic device 310 may be received by each of the electronic device 200 and the second external electronic device 320.

According to an embodiment, the electronic device 200 may transmit/receive data with respect to the second external electronic device 320 via a third communication path 306. The third communication path 306 may be a communication path which uses various communication protocols. For example, the third communication path 306 may support at least one communication protocol out of UWB communication and OOB communication. For example, the electronic device 200 may create a ranging session between the electronic device 200 and the second external electronic device 320 to identify a location of the second external electronic device. The electronic device 200 may measure a distance to the second external electronic device 320 through the ranging session. According to an embodiment, the electronic device 200 may identify a location of the first external electronic device 310 with respect to the electronic device 200, based on the distance between the electronic device 200 and the second external electronic device 320, identified through the ranging session. The identifying of the location of the first external electronic device 310 will be described in greater detail below with reference to FIG. 4 to FIG. 8.

According to an embodiment, in a process of positioning an external electronic device (e.g., the first external electronic device 310, the second external electronic device 320), the electronic device 200 may use an Angle of Arrival (AoA) of a signal received from the external electronic device. The electronic device 200 may identify the AoA of the signal received from the first external electronic device 310 and/or the second external electronic device 320, and may identify an angle at which the first external electronic device 310 and/or the second external electronic device 320 are located with respect to the electronic device 200 through the AoA of the signal. According to an embodiment, the electronic device 200 may use a distance between two or more antennas which receive a signal from the external electronic device and a Phase Difference of Arrival (PDoA) of a signal received from each of the antennas to calculate the AoA of the signal.

According to an embodiment, the electronic device 200 may calculate the PDoA of the signal, based on a signal received from the second external electronic device 320 through the ranging session created between the electronic device 200 and the second external electronic device 320. The electronic device 200 may obtain first angle information on an angle at which the second external electronic device 320 is located with respect to the electronic device 200, based on the AoA of the signal. According to an embodiment, the electronic device 200 may calculate a PDoA of the advertising frame, based on the advertising frame received from the first external electronic device 310. The electronic device 200 may obtain second angle information on an angle at which the first external electronic device 310 is located with respect to the electronic device 200, based on the AoA of the advertising frame obtained based on the PDoA. According to an embodiment, the electronic device 200 may identify a location of the first external electronic device 301 with respect to the electronic device 200, based on the first angle information and the second angle information. The identifying of the location of the first external electronic device 310 will be described in greater detail below with reference to FIG. 4 to FIG. 8.

According to an embodiment, the electronic device 200 may receive AoA information from the external electronic device (e.g., the second external electronic device 320). For example, the second external electronic device 320 may identify an AoA of a signal received from the electronic device 200, and may identify an angle at which the electronic device 200 is located with respect to the second external electronic device 320 through the AoA of the signal. The second external electronic device 320 may transmit AoA information associated with the identified angle to the electronic device 200. The electronic device 200 may receive the AoA information identified by the second external electronic device 329 via the communication circuit 210.

Figure 4:
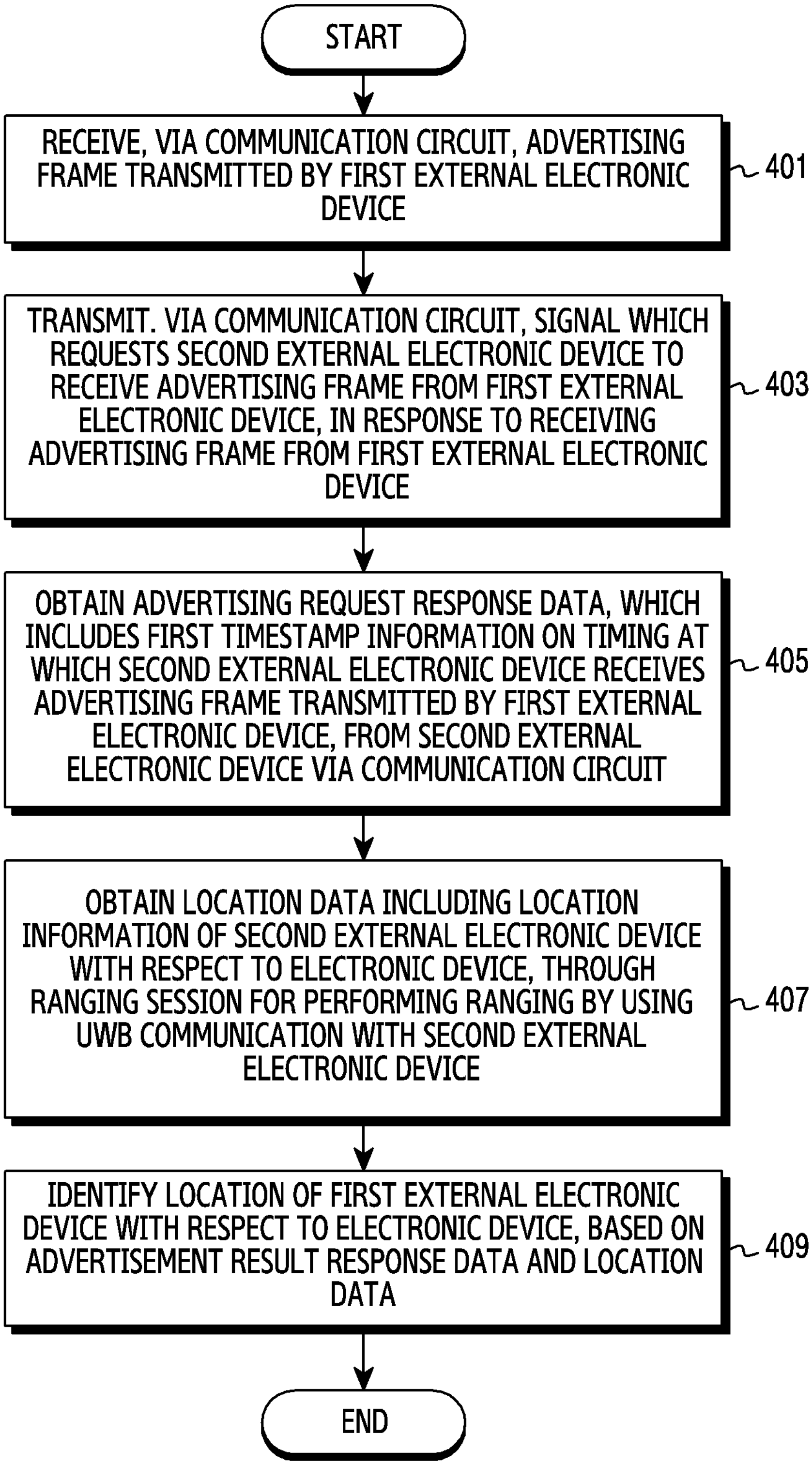
FIG. 4 is a flowchart illustrating an example operation in which an electronic device identifies a location of a first external electronic device according to various embodiments.

FIG. 4 is a flowchart illustrating an example operation in which the electronic device 200 identifies a location of the first external electronic device 310 according to various embodiments. It may be understood that operations of FIG. 4 may be performed by the processor 220 of FIG. 2.

According to an embodiment, in operation 401, the processor 220 may receive via the communication circuit 210 an advertising frame transmitted by the first external electronic device 310.

According to an embodiment, the processor 220 may further perform an operation of enabling the communication circuit 210 before performing the operation 401. According to an embodiment, when a specific trigger condition is satisfied, the processor 220 may enable the communication circuit 210 which supports UWB communication. For example, upon receiving a BLE beacon satisfying a specified condition, the processor 220 may determine that the trigger condition is satisfied and thus enable the communication circuit 210. As another example, the processor 220 may determine that the trigger condition is satisfied and thus enable the communication circuit 210, even when arrival at a specific place is determined.

According to an embodiment, the processor 220 may receive via the communication circuit 210 advertising frames, transmitted by the first external electronic device 310. For example, the processor 220 may further receive the advertising frames transmitted by the first external electronic device 310 after the advertising frame received in the operation 401.

According to an embodiment, upon receiving the advertising frame, the processor 220 may determine whether it is necessary to identify a distance between the electronic device 200 and the first external electronic device 310. For example, the processor 220 may determine that it is necessary to identify the distance between the electronic device 200 and the first external electronic device 310, when there is a need to identify whether the first external electronic device 310 is present within a specified distance upon receiving the advertising frame.

According to an embodiment, the processor 220 may further perform an operation of determining the second external electronic device 320 between the operations 401 and 403. For example, when an external device including the same user account information as the user of the electronic device 200 is present around the electronic device 200, the processor 220 may determine the external device as the second external electronic device 320. For example, in the presence of an external device coupled in advance to the electronic device 200 (e.g., a device coupled in advance through BLE or the like, a device coupled to the same AP), the processor 220 may determine the external device as the second external electronic device 320. As another example, when the external device including the same user account information as the user of the electronic device 200 is not present around the electronic device 200, the processor 220 may transmit an aid request signal for positioning towards the external devices around the electronic device 200. The processor 220 may determine a specific external device which has responded to the aid request signal as the second external electronic device 320.

According to an embodiment, in operation 403, the processor 220 may transmit via the communication circuit 210 a signal which requests the second external electronic device 320 to receive the advertising frame from the first external electronic device 310, in response to receiving the advertising frame from the first external electronic device 310. In the disclosure, the signal which requests the second external electronic device 320 to receive the advertising signal from the first external electronic device 310 may be referred to as a first request signal.

According to an embodiment, the processor 220 may transmit the first request signal, which requests the second external electronic device 320 to receive the advertising frame from the first external electronic device 310, through in-band (e.g., UBW) or Out Of Band (OOB) (e.g., Bluetooth Low Energy (BLE)). According to an embodiment, before the processor 220 transmits the first request signal to the second external electronic device 320 through OOB communication, an operation of coupling the second external electronic device 320 to OOB communication may be added. For example, the processor 220 may couple the second external electronic device 320 to the OOB communication, and may transmit the first request signal to the second external electronic device 320 through the OOB communication.

According to an embodiment, the processor 220 may transmit the first request signal including information required for the second external electronic device 320 to receive the advertising frame transmitted by the first external electronic device 310. For example, in order to receive the advertising frame transmitted by the first external electronic device 310, there may be a need to execute a specific application or to receive a parameter in advance through OOB communication. In this case, information (e.g., a session Identifier (ID) or a Physical (PHY) parameter) required to allow the second external electronic device 320 to receive the advertising frame may be included in the first request signal.

According to an embodiment, the processor 220 may transmit a second request signal which requests for a ranging session created between the electronic device 200 and the second external electronic device 320 for positioning of the second external electronic device 320, together with the first request signal. The second request signal will be described in greater detail below with reference to FIG. 5.

According to an embodiment, in operation 405, the processor 220 may obtain (or receive) advertising request response data, which includes first timestamp information on a timing at which the second external electronic device 320 receives the advertising frame transmitted by the first external electronic device 310, from the second external electronic device 320 via the communication circuit 210.

According to an embodiment, the second external electronic device 320 may create an advertisement reception session for receiving the advertising frame from the first external electronic device 310 in response to receiving the first request signal from the electronic device 200, and when the second external electronic device 320 receives the advertising frame, may transmit to the electronic device 200 information (e.g., first timestamp information) on a timing at which the advertising frame is received. For example, the first external electronic device 320 may transmit the first timestamp information to the electronic device 200 through UWB communication (or BLE communication). The first timestamp information will be described in greater detail below with reference to FIG. 5 and FIG. 6.

According to an embodiment, the operation in which the second external electronic device 320 creates the advertisement reception session for receiving the advertising frame from the first external electronic device 310 may include an operation of setting a PHY/MAC parameter and waiting by enabling a Receive (Rx) antenna and/or an Rx module so that the second external electronic device 320 receives the advertising frame transmitted by the first external electronic device 310.

According to an embodiment, in operation 407, the processor 220 may obtain location data including location information of the second external electronic device 320 with respect to the electronic device 200, through a ranging session for performing ranging using UWB communication with the second external electronic device 320.

According to an embodiment, the processor 220 may create the ranging session to measure a location of the second external electronic device 320 using the UWB communication. For example, the processor 220 may create the ranging session to perform positioning of the second external electronic device 320 using the UWB communication. The processor 220 may identify the location of the second external electronic device 320 through the ranging session.

According to an embodiment, the processor 220 may identify a distance between the electronic device 200 and the second external electronic device 320, based on a transmission time of transmitting signals between the electronic device 200 and the second external electronic device 320, using a Two Way Ranging (TWR) or Double-Sided Two Way Ranging (DS-TWR) scheme. Location data of the operation 407 may include distance information on the distance between the electronic device 200 and the second external electronic device 320. The TWR will be additionally described in greater detail below with reference to FIG. 6.

According to an embodiment, the processor 220 may obtain first angle information on an angle at which the second external electronic device 320 is located with respect to the electronic device 200, based on an AoA of a signal received from the second external electronic device 320 through a ranging session. For example, the processor 220 may obtain a PDoA of the signal, calculated based on the signal received from the second external electronic device 320 through the ranging session, and may obtain the AoA of the signal, based on the PDoA. The processor 220 may identify an angle at which the second external electronic device 320 is located with respect to the electronic device 200, based on the AoA of the signal. The first angle information on the angle at which the second external electronic device 320 is located with respect to the electronic device 200 may be included in the location data of operation 407.

According to an embodiment, in operation 409, the processor 220 may identify a location of the first external electronic device 310 with respect to the electronic device 200, based on advertisement result response data and location data. A method of identifying the location of the first external electronic device 310 will be described in greater detail below with reference to FIG. 8, at least based on the advertisement result response data and the location data.

According to an embodiment, the processor 220 may obtain second angle information on an angle at which the first external electronic device 310 is located with respect to the electronic device 200, based on the AoA of the advertising frame received from the first external electronic device 310 in the operation 401 or the advertising frame received from the first electronic device 310 after the operation 401. The processor 220 may identify the location of the first external electronic device 310, based on the second angle information together with the advertisement result response data and the location data.

Figure 5:
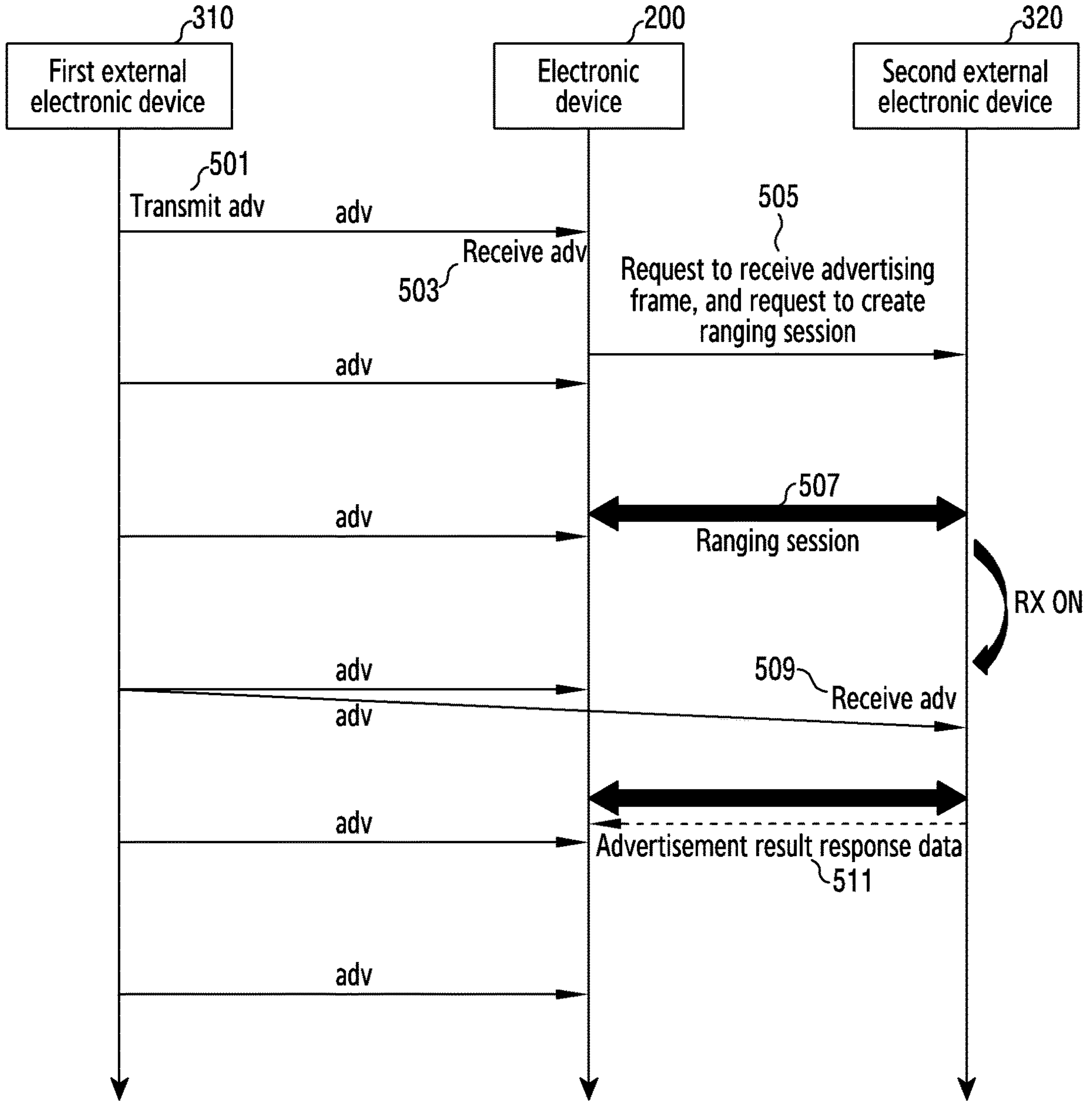
FIG. 5 is a signal flow diagram illustrating an example operation in which an electronic device identifies a location of a first external electronic device using a second external electronic device, when an electronic device receives an advertising frame from a first external electronic device in a state where a ranging session is not created between the electronic device and the first external electronic device, according to various embodiments.

FIG. 5 is a signal flow diagram illustrating an example operation in which the electronic device 200 identifies a location of the first external electronic device 310 using the second external electronic device 320, when the electronic device 200 receives an advertising frame from the first external electronic device 310 in a state where a ranging session is not created between the electronic device 200 and the first external electronic device 310, according to various embodiments.

According to an embodiment, in operation 501, the first external electronic device 310 may transmit an advertising frame. For example, the first external electronic device 310 (e.g., an advertiser) may transmit the advertising frames every specified interval. The first external electronic device 310 may broadcast the advertising frame, and may not receive data from a peripheral device.

According to an embodiment, in operation 503, the electronic device 200 may receive the advertising frame transmitted by the first external electronic device 310. The processor 220 may receive any one frame out of the advertising frames transmitted by the first external electronic device 310 via the communication circuit 210.

According to an embodiment, regarding the advertising frame received by the electronic device 200 in the operation 503, the second external electronic device 320 may not be able to receive the advertising frame. For example, the second external electronic device 320 may receive the advertising frame only while an additional session (e.g., an advertisement reception session 604 of FIG. 6) is created. Therefore, the electronic device 200 may receive the advertising frame transmitted by the first external electronic device 310 in the operation 501, but the second external electronic device 320 may not be able to receive the advertising frame.

According to an embodiment, in operation 505, the electronic device 200 may request the second external electronic device 320 to receive the advertising frame from the first external electronic device 310 and to create a ranging session with the electronic device 200. For example, the processor 220 may transmit via the communication circuit 210 a first request signal which requests the second external electronic device 320 to receive the advertising frame. The second external electronic device 320 may create an advertisement reception session for receiving the advertising frame transmitted by the first external electronic device 310, in response to the first request signal. In addition, the processor 220 may transmit via the communication circuit 210 a second request signal which requests the second external electronic device 320 to create a ranging session with the electronic device 200. According to an embodiment, the first request signal and/or the second request signal may be transmitted from the electronic device 200 to the second external electronic device 320 through in-band (e.g., UWB) or Out Of Band (OOB) (e.g., Bluetooth Low Energy (BLE)).

According to an embodiment, the processor 220 may transmit to the second external electronic device 320 the second request signal including at least one of a session ID, a MAC address, and information on a PHY configuration to create a ranging session between the electronic device 200 and the second external electronic device 320. The second external electronic device 320 may perform UWB communication by creating the ranging session with the electronic device 200, based on at least one of the session ID, the MAC address, and the information on the PHY configuration, included in the second request signal.

According to an embodiment, in operation 507, the electronic device 200 may create the ranging session with the second external electronic device 320. The processor 220 may create a plurality of ranging blocks in which the electronic device 200 and the second external electronic device 320 are able to perform UWB communication, every specified ranging interval. According to an embodiment, the processor 220 may identify a distance between the electronic device 200 and the second external electronic device 320 through the ranging session.

According to an embodiment, the second external electronic device 320 may create an advertisement reception session between the plurality of ranging blocks created every specified ranging interval. The second external electronic device 320 may switch to the advertisement reception session when the ranging session created in the operation 507 is terminated. According to an embodiment, the second external electronic device 320 may wait until an advertising frame transmitted by the first external electronic device 320 is received in a state where an RX antenna and/or Rx module included in to the second external electronic device are enabled.

According to an embodiment, in operation 509, the second external electronic device 320 may receive the advertising frame transmitted by the first external electronic device 310. The second external electronic device 320 may receive any one frame out of the advertising frames transmitted by the first external electronic device 310. According to an embodiment, the electronic device 200 may also receive the advertising frame transmitted by the first external electronic device 310. For example, the electronic device 200 may receive an advertising frame corresponding to the advertising frame received by the second external electronic device 320 in the operation 509.

According to an embodiment, the second external electronic device 320 may identify a timing at which the advertising frame is received in the operation 509. The second external electronic device 320 may obtain first timestamp information 521 for the timing at which the advertising frame is received.

According to an embodiment, in operation 511, the second external electronic device 320 may transmit advertisement result response data including the first timestamp information 521 to the electronic device 200. The electronic device 200 may receive the advertisement result response data from the second external electronic device 320. According to an embodiment, the electronic device 200 may receive the advertisement result response data through the ranging session from the second external electronic device 320. The second external electronic device 320 may transmit advertisement result response data using a ranging session created to perform ranging using UWB communication with the electronic device 200.

According to an embodiment, the first timestamp information and second timestamp information may be included in the advertisement result response data. For example, the first timestamp information may be timestamp information on a timing at which the second external electronic device 320 receives the advertising frame from the first external electronic device 310. The second timestamp information will be described in greater detail below with reference to FIG. 6.

According to an embodiment, in operation 511, the electronic device 200 may identify a location of the first external electronic device 310 with respect to the electronic device 200, at least based on the advertisement result response data received from the second external electronic device 320. For example, the electronic device 200 may identify a distance between the electronic device 200 and the first external electronic device 310, at least based on the advertisement result response data.

Figure 6:
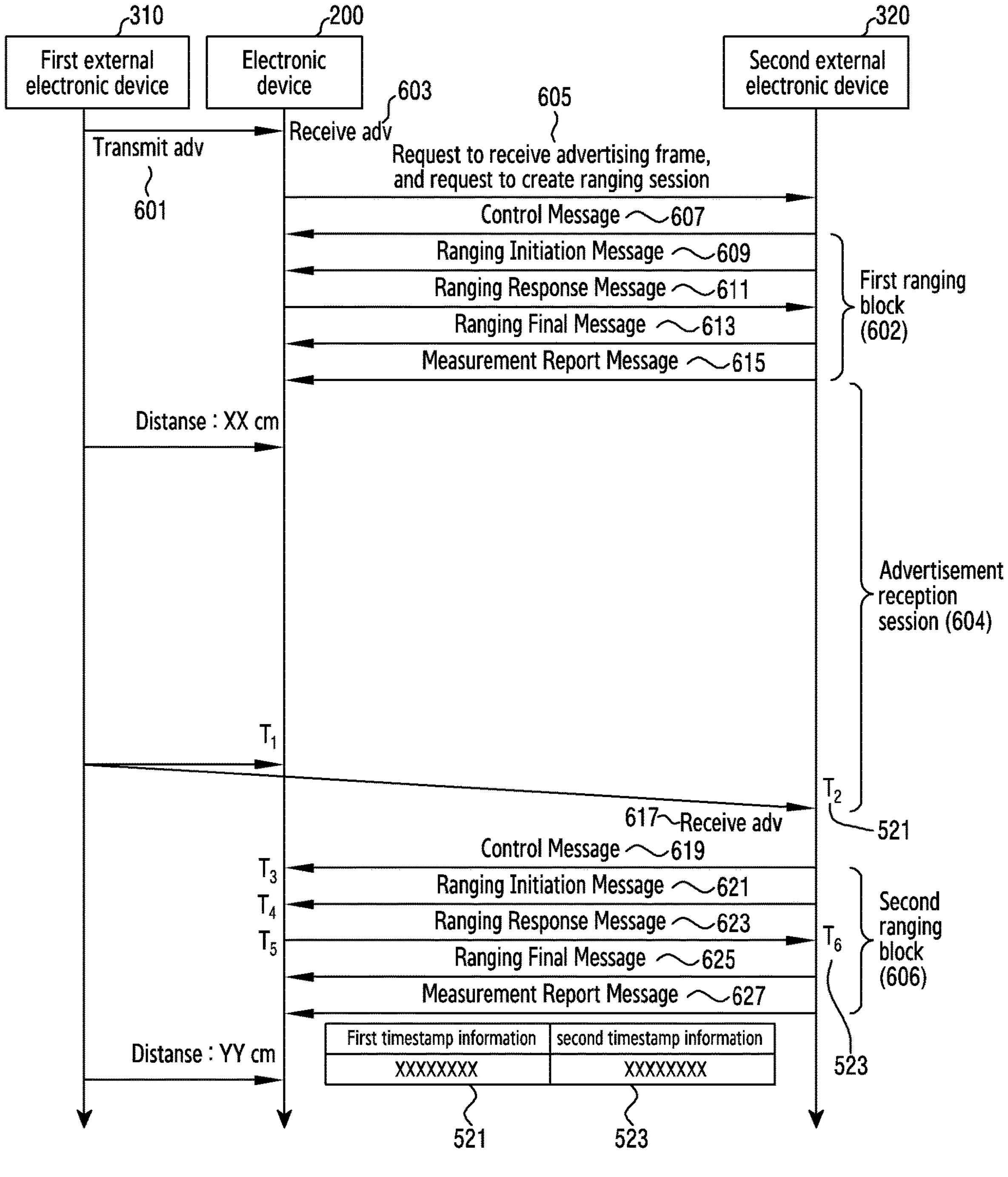
FIG. 6 is a signal flow diagram illustrating an example operation in which an electronic device identifies a location of a first external electronic device using a second external electronic device, when the electronic device receives an advertising frame in a state where a ranging session is not created between the electronic device and the first external electronic device, according to various embodiments.

FIG. 6 is a signal flow diagram illustrating an example operation in which the electronic device 200 identifies a location of the first external electronic device 310 using the second external electronic device 320, when the electronic device 200 receives an advertising frame in a state where a ranging session is not created between the electronic device 200 and the first external electronic device 310, according to various embodiments.

According to an embodiment, in operation 601, the first external electronic device 310 may transmit an advertising frame. The operation 601 may correspond to the operation 501 of FIG. 5.

According to an embodiment, in operation 603, the electronic device 200 may receive the advertising frame transmitted by the first external electronic device 310. The operation 603 may correspond to the operation 503 of FIG. 6.

According to an embodiment, in operation 605, the electronic device 200 may request the second external electronic device 320 to receive the advertising frame from the first external electronic device 310 and to create a ranging session with the electronic device 200. The operation 605 may correspond to the operation 505 of FIG. 5.

According to an embodiment, the electronic device 200 may create a ranging session capable of performing UWB communication with the second external electronic device 320. For example, the processor 220 may create a plurality of ranging blocks for positioning of the second external electronic device 320. The plurality of ranging blocks may include a first ranging block 602 and a second ranging block 606. Although it is illustrated in FIG. 6 that two ranging blocks are created, three or more ranging blocks may be created every specified ranging interval.

According to an embodiment, in operation 607, the second external electronic device 320 may transmit a control message to the electronic device 200. The electronic device 200 may receive the control message from the second external electronic device 320. The processor 220 may receive the control message from the second external electronic device 320 via the communication circuit 210. The control message may include information for controlling ranging operations performed in the first ranging block 602.

According to an embodiment, in operation 609, the second external electronic device 320 may transmit a first message corresponding to a ranging initiation message to the electronic device 200. The electronic device 200 may receive the first message corresponding to the ranging initiation message from the second external electronic device 320. According to an embodiment, the electronic device 200 may identify a distance between the electronic device 200 and the second external electronic device 320, based on a time duration from a timing at which the first message is transmitted from the second external electronic device 320 to a timing at which the first message is received in the electronic device 200.

According to an embodiment in operation 611, the electronic device 200 may transmit a second message corresponding to a ranging response message to the second external electronic device 320, in response to receiving the first message. The second external electronic device 320 may receive the second message corresponding to the ranging response message from the electronic device 200. According to an embodiment, the electronic device 200 may identify a distance between the electronic device 200 and the second external electronic device 320, based on a time duration from a timing at which the second message is transmitted from the electronic device 200 to a timing at which the second message is received in the second external electronic device 320. According to an embodiment, the distance between the electronic device 200 and the second external electronic device 320 may be identified with improved accuracy, based on an operation in which the electronic device 200 receives the first message in operation 609 and transmits the second message in the operation 611. It may be understood that the operation in which the processor 220 identifies the distance between the electronic device 200 and the second external electronic device 320 according to the operations 609 and 611 is at least part of a Two Way Ranging (TWR) operation.

According to an embodiment, in operation 613, the second external electronic device 320 may transmit a third message corresponding to a ranging final message to the electronic device 200. The electronic device 200 may receive the third message corresponding to the ranging final message from the second external electronic device 320. According to an embodiment, the electronic device 200 may identify a distance between the electronic device 200 and the second external electronic device 320, based on a time duration from a timing at which the third message is transmitted from the second external electronic device 320 to a timing at which the third message is received in the electronic device 200. According to an embodiment, the distance between the electronic device 200 and the second external electronic device 320 may be identified with more improved accuracy, based on an operation in which the electronic device 200 receives the first message in the operation 609, transmits the second message in the operation 611, and receives the third message in the operation 613. It may be understood that the operation in which the processor 220 identifies the distance between the electronic device 200 and the second external electronic device 320 according to the operations 609, 611, and 613 is at least part of a Double-Sided Two Way Ranging (DS-TWR) operation.

According to an embodiment, in operation 615, the second external electronic device 320 may transmit a measurement report message to the electronic device 200. The electronic device 200 may receive the measurement report message from the second external electronic device 320. According to an embodiment, timestamp information on a timing at which the second external electronic device 320 transmits the first message, timestamp information on a timing at which the second external electronic device 320 receives the second message, and timestamp information on a timing at which the second external electronic device 320 receives the third message may be included at least in part in the measurement report message.

According to an embodiment, the processor 220 may identify the distance between the electronic device 200 and the second external electronic device 320, at least based on the timestamp information included at least in part in the measurement report message received from the second external electronic device 320. The processor 220 may identify the distance between the electronic device 200 and the second external electronic device 320, based on at least part of the timestamp information included in the measurement report message and timestamp information on the timing at which the electronic device 200 transmits/receives the first to third message during the first ranging block 602. For example, the processor 220 may identify a time required for the first, second, and third messages to be transmitted/received between the electronic device 200 and the second external electronic device 320, and may measure the distance between the electronic device 200 and the second external electronic device 320 by multiplying the required time by a speed (e.g., speed of light) at which data is transmitted/received.

According to an embodiment, the operations 607 to 615 of FIG. 6 may correspond to the operation 507 of FIG. 5, or may be included in the operation 507 of FIG. 5.

According to an embodiment, it may be understood that a range from a timing at which the second external electronic device 320 transmits a control message in the operation 607 to a timing at which the electronic device 200 receives the measurement report message in the operation 615 is included in the first ranging block. According to an embodiment, the second external electronic device 320 may switch to an advertisement reception session 604 when the first ranging block 602 ends.

According to an embodiment, the second external electronic device 320 may receive an advertising frame transmitted by the first external electronic device 310 for a time duration in which the advertisement reception session 604 is enabled. The second external electronic device 320 may allow an Rx antenna and/or RX module capable of receiving the advertising frame transmitted by the first external electronic device 310 during the advertisement reception session 604 to remain in an on-state.

According to an embodiment, in operation 617, the second external electronic device 320 may receive the advertising frame transmitted by the first external electronic device 310. The operation 617 may correspond to the operation 509 of FIG. 5. According to an embodiment, the second external electronic device 320 may obtain the first timestamp information 521 for a timing at which the advertising frame is received. For example, the second external electronic device 320 may obtain the first timestamp information indicating that a timestamp of the timing at which the advertising frame is received is $T_2$.

According to an embodiment, the electronic device 200 may also receive an advertising frame corresponding to the advertising frame received by the second external electronic device 320 in the operation 617. The first external electronic device 310 may transmit the advertising frames every specified interval, and the electronic device 200 and the second external electronic device 320 may receive an advertising frame transmitted at a specific timing. According to an embodiment, the electronic device 200 may obtain information on a timing at which the advertising frame is received. For example, the electronic device 200 may obtain information indicating that a timestamp of a timing at which an advertising frame transmitted by the first external electronic device 310 is received is $T_1$.

According to an embodiment, when the electronic device 200 and the second external electronic device 320 are located at different distances with respect to the first external electronic device 310, $T_1$ and $T_2$ may have different values. For example, when the electronic device 200 is located closer to the second external electronic device 320 with respect to the first external electronic device 310, $T_1$ may correspond to a timing earlier than $T_2$. As another example, when the electronic device 200 is located farther than the second external electronic device 320 with respect to the first external electronic device 310, $T_1$ may correspond to a timing later than $T_2$.

According to an embodiment, the second external electronic device 320 may terminate the advertisement reception session 604 in response to receiving the advertising frame transmitted by the first external electronic device 310.

According to an embodiment, the electronic device 200 may create the second ranging block 606 for UWB communication with the second external electronic device 320. According to an embodiment, the electronic device 200 and the second external electronic device 320 may perform the operations 619 to 627 during the second ranging block 606. Descriptions on the operations 607 to 615 performed during the first ranging block 602 may be applied to the operations 619 to 627 performed during the second ranging block 606. For example, in operation 627, the electronic device 200 may identify a distance (hereinafter, 'a') between the electronic device 200 and the second external electronic device 320, based on timestamp information obtained from the second external electronic device 320 and timestamp information on a timing at which the electronic device 200 transmits/receives the first to third messages during the second ranging block 606. A distance to the second external electronic device 320, measured by the electronic device 200 through the second ranging block 606, may be equal to or different from a distance to the second external electronic device 320, measured via the first ranging block 602.

According to an embodiment, a timestamp of a timing at which the electronic device 200 receives a control message from the second external electronic device 320 may be $T_3$. According to an embodiment, a timing at which the electronic device 200 receives the first message from the second external electronic device 320 may be $T_4$. According to an embodiment, a timing at which the electronic device 200 transmits the second message to the second external electronic device 320 may be $T_5$. According to an embodiment, a timing at which the second external electronic device 320 receives the second message from the electronic device 200 may be $T_6$.

According to an embodiment, in operation 623, the second external electronic device 320 may obtain second timestamp information 523 on a timing at which the second message, e.g., a ranging response message, is received from the electronic device 200. For example, the second external electronic device 320 may identify the second timestamp information 523 indicating that a timing of receiving the second message from the electronic device 200 during the second ranging block 606 is $T_6$.

According to an embodiment, upon transmitting the measurement report message to the electronic device 200 in the operation 627, the second external electronic device 320 may transmit advertisement result response data including the first timestamp information 521 and the second timestamp information 523 together. In the operation 627, the electronic device 200 may receive the measurement report message and the advertisement result response data.

According to an embodiment, in the operation 627, the second external electronic device 320 may transmit to the electronic device 200 the measurement report message including the advertisement result response data. The electronic device 200 may obtain the advertisement result response data included in the measurement report message from the second external electronic device 320.

According to an embodiment, the second external electronic device 320 may transmit the advertisement result response data to the electronic device 200 through an additional frame, in addition to the measurement report message of the second ranging block 606.

According to an embodiment, the processor 220 may obtain the advertisement result response data including the first timestamp information 521 and the second timestamp information 523 from the second external electronic device 320 via the communication circuit 210. According to an embodiment, the electronic device 200 (or the processor 220) may identify a difference (hereinafter, 'c-b') between a distance (hereinafter, 'b') from the first external electronic device 310 to the electronic device 200 and a distance (hereinafter, 'c') from the first external electronic device 310 to the second external electronic device 320, at least based on the first timestamp information 521 and second timestamp information 523 included in the advertisement result response data. Equations 1 to 3 represent an example of a method for calculating 'c-b', at least based on $T_1$ to $T_6$.

$$T_7 = T_5 + \frac{a}{\text{speed of light} * 15.65\ \text{ps}} - T_6 \quad \text{[Equation 1]}$$

$$\text{clock error} = \frac{T_4 - T_3}{\text{slot duration}} - 1 \quad \text{[Equation 2]}$$

$$c - b = [T_1 - T_2 - \{T_7 + (T_5 - T_1) * \text{clock error}\}] * \text{speed of light} \quad \text{[Equation 3]}$$

According to an embodiment, the processor 220 may calculate the difference 'c-b' between the distance 'b' from the first external electronic device 310 to the electronic device 200 and the distance 'c' from the first external electronic device 310 to the second external electronic device 320, based on the timing $T_1$ of receiving the advertising frame, $T_2$ corresponding to the first timestamp information 521 included in the advertisement result response data, $T_3$ of receiving the control message from the second external electronic device 320, $T_4$ of receiving the first message, e.g., a ranging initiation message, from the second external electronic device 320, $T_5$ of transmitting the second message, e.g., a ranging response message, to the second external electronic device 320, $T_6$ corresponding to the second timestamp information 523 included in the advertisement result response data, and the distance 'a' between the electronic device 200 and the second external electronic device 320, measured during the second ranging block 606. 'c-b' is calculated by substituting the timings $T_1$ to $T_6$, the distance 'a', and the speed of light to Equations 1 to 3. In this case, 15.65 ps in Equation 1 corresponds to Ranging Counter Time Unit (RCTU), which is the unit of timestamp, and is a value conforming to the definition of IEEE. In addition, $T_7$ in Equation 1 refers to a time difference of a UWB system between the electronic device 200 and the second external electronic device 320. Additional descriptions on the value 'c-b' obtained by Equations 1 to 3 will be described in greater detail below with reference to FIG. 8.

Referring to FIG. 6, the processor 220 may obtain first location data including a location of the second external electronic device 320 with respect to the electronic device 200 for a time duration in which the first ranging block 602 is enabled, and may obtain second location data including a location of the second external electronic device 320 with respect to the electronic device 200 for a time duration in which the second ranging block 606 is enabled. For example, the processor 220 may obtain a distance (hereinafter, 'a1') between the electronic device 200 and the second external electronic device 320 also in the first ranging block 601, and may obtain a distance (hereinafter, 'a2') between the electronic device 200 and the second external electronic device 320 also in the second ranging block 606.

According to an embodiment, the processor 220 may select either the first location data or the second location data, based on the first timestamp information 521, and may identify the location of the first external electronic device 310 with respect to the electronic device 200, based on the selected location data. The processor 220 may select either the first location data or the second location data, based on to which ranging block out of the first ranging block 602 and the second ranging block 606 the timing $T_2$ corresponding to the first timestamp information 521 is temporally closer. For example, the processor 220 may select either the distance a1 based on the first ranging block 602 and the distance a2 based on the second ranging block 606, and may obtain c-b, at least based on one of the selected distances a1 and a2. Referring to FIG. 6, since $T_2$ is temporally closer to the second ranging block 606 than the first ranging block 602, the processor 220 may calculate c-b, based on the distance a2 obtained through the second ranging block 606. For more accurate positioning of the first external electronic device 310, the electronic device 200 may use a temporal closeness level to improve accuracy of the distance 'a' between the electronic device 200 and the second external electronic device 320, based on the timing $T_2$ at which the second external electronic device 320 receives an advertising frame.

Figure 7:
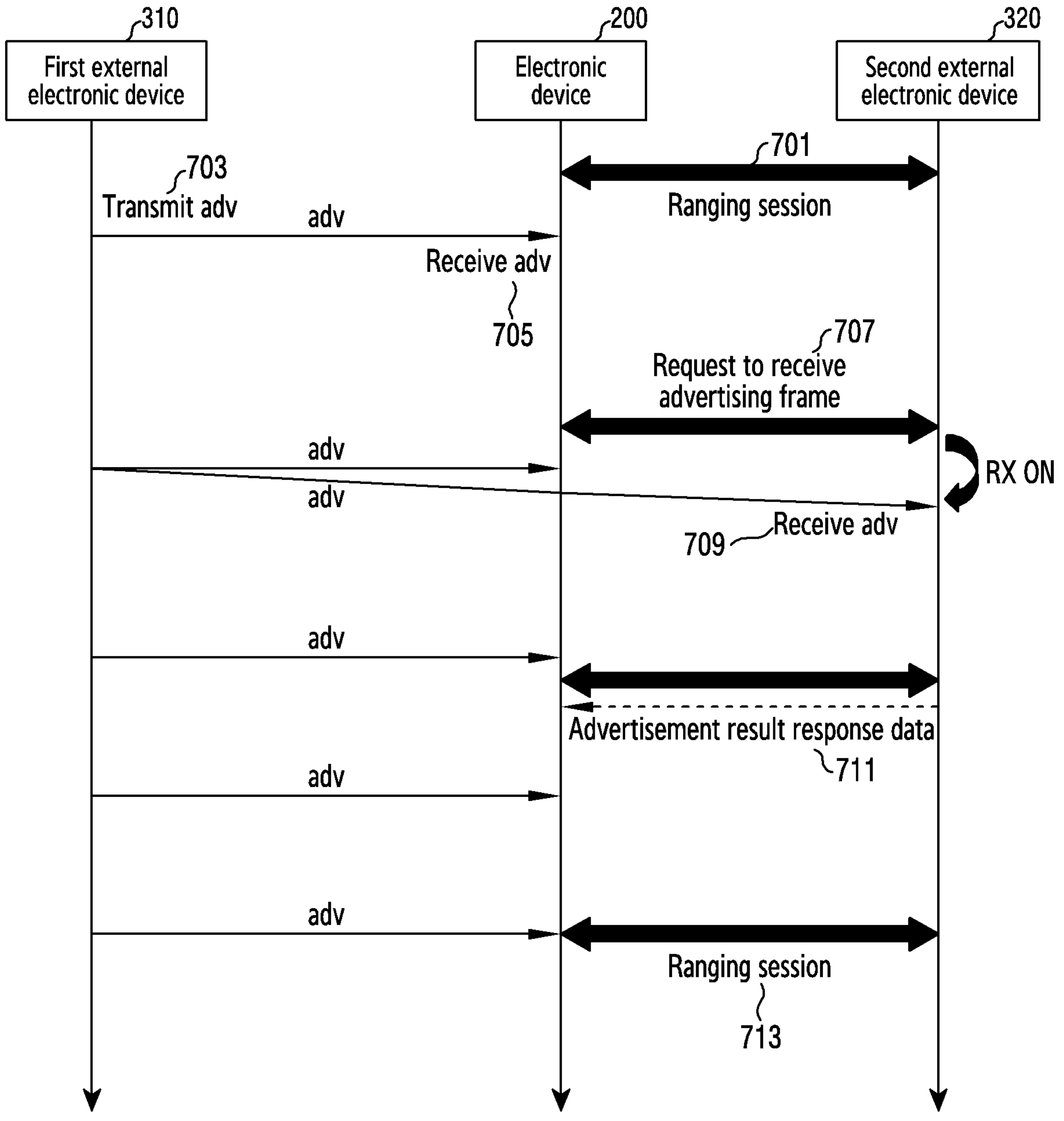
FIG. 7 is a signal flow diagram illustrating an example operation in which an electronic device identifies a location of a first external electronic device using a second external electronic device, when the electronic device receives an advertising frame in a state where a ranging session is created between the electronic device and the second external electronic device, according to various embodiments.

FIG. 7 is a signal flow diagram illustrating an example operation in which the electronic device 200 identifies a location of the first external electronic device 310 using the second external electronic device 320, when the electronic device 200 receives an advertising frame in a state where a ranging session is created between the electronic device 200 and the second external electronic device 320, according to various embodiments. FIG. 7 focuses on descriptions different from those explained with reference to FIG. 5 and FIG. 6, and except for those descriptions, the same descriptions explained with reference to FIG. 5 and FIG. 6 may be applied.

According to an embodiment, the electronic device 200 may create a ranging session with the second external electronic device 320 to periodically perform positioning of the second external electronic device 320. For example, for positioning of the second external electronic device 320 such as a smart watch coupled to the electronic device 200 through wireless communication, the processor 220 may create a ranging session (e.g., a plurality of ranging blocks) between the electronic device 200 and the second external electronic device 320. According to an embodiment, operation 701 may refer to an operation in which the electronic device 200 creates a ranging session for UWB communication with the second external electronic device 320, irrespective of receiving of an advertising frame.

According to an embodiment, in operation 703, the first external electronic device 310 may transmit the advertising frame. The operation 703 may correspond to the operation 501 of FIG. 5.

According to an embodiment, in operation 705, the electronic device 200 may receive the advertising frame. The processor 220 may receive the advertising frame from the first external electronic device 310 in a state where the ranging session is created (e.g., the operation 701).

According to an embodiment, in operation 707, the electronic device 200 may transmit a first request signal which requests the second external electronic device 320 to receive the advertising frame from the first external electronic device 310, through the ranging session created in advance. For example, the processor 220 may transmit the first request signal through in-band, using a ranging session being created periodically between the second external electronic device 320 and the electronic device 200.

According to an embodiment, in operation 709, the electronic device 200 and the second external electronic device 320 may receive the advertising frame transmitted by the first external electronic device 310. Operation 709 may correspond to the operation 509 of FIG. 5 and the operation 617 of FIG. 6. The second external electronic device 320 may obtain the first timestamp information 521 on a timing of receiving the advertising frame.

According to an embodiment, in operation 711, the second external electronic device 320 may transmit advertisement result response data, through the ranging session created in advance. The electronic device 200 may receive the advertisement result response data through the ranging session. The first timestamp information 521 and the second timestamp information 523 may be included in the advertisement result response data.

According to an embodiment, in operation 713, the electronic device 200 may persistently create a ranging session for UWB communication with the second external electronic device 320. In FIG. 5 and FIG. 6, the electronic device 200 transmits a second request signal for creating a ranging session to perform positioning of the first external electronic device 310, thereby creating the ranging session. In FIG. 7, since the ranging session is created irrespective of receiving of the advertising frame, a ranging session with the second external electronic device 320 may be persistently created even after the electronic device 200 receives advertisement result response data.

Figure 8:
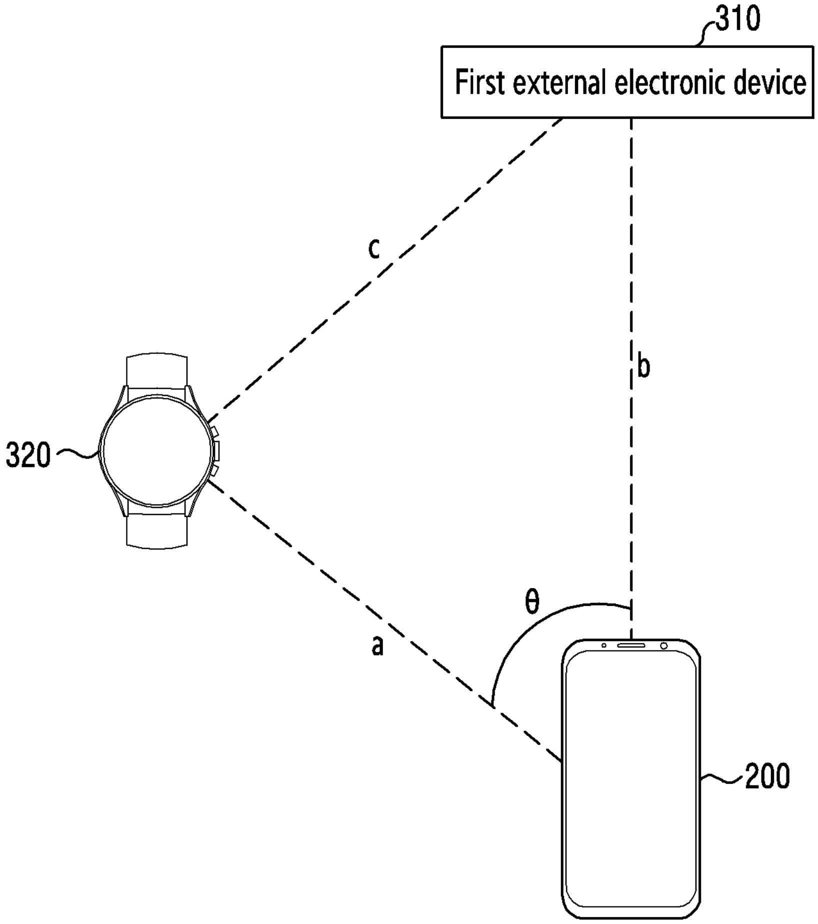
FIG. 8 is a diagram illustrating an example method in which an electronic device identifies a location of a first external electronic device with respect to the electronic device, based on advertisement result response data and location data, according to various embodiments.

FIG. 8 is a diagram illustrating an example of a method in which the electronic device 200 identifies a location of the first external electronic device 310 with respect to the electronic device 200, based on advertisement result response data and location data, according to various embodiments.

Referring to FIG. 8, a distance between the electronic device 200 and the second external electronic device 320 may be referred to as 'a', a distance between the electronic device 200 and the first external electronic device 319 may be referred to as 'b', and a distance between the first external electronic device 310 and the second external electronic device 320 may be referred to as 'c'. In addition, an angle from a direction in which the electronic device 200 faces the first external electronic device 310 to a direction in which the electronic device 200 faces the second external electronic device 320 may be referred to as θ.

According to an embodiment, the processor 220 may measure the distance 'a' through a ranging session created between the electronic device 200 and the second external electronic device 320. The processor 220 may measure a time required to transmit/receive data, based on timestamp information on a timing at which the electronic device 200 and the second external electronic device 320 transmit/receive data mutually, and may identify the distance 'a', based on the time and the speed of light.

According to an embodiment, the processor 220 may measure c-b, based on Equations 1 to 3 described with reference to FIG. 5. When the electronic device 200 and the first external electronic device 310 are located with different distances with respect to the first external electronic device 310, the advertising frames transmitted by the first external electronic device 310 may be received at different timings, and the distance difference c-b may be calculated based thereon.

According to an embodiment, the processor 220 may receive the advertising frame transmitted by the first external electronic device 310. The processor 220 may obtain an AoA at which the advertising frame is received, and may obtain an angle at which the first external electronic device 310 is located with respect to the electronic device 200, based on the AoA. According to an embodiment, the processor 220 may transmit/receive data with respect to the second external electronic device 320 through a ranging session created for UWB communication with the second external electronic device 320. The processor 220 may obtain an AoA of a signal transmitted by the second external electronic device 320, and may also obtain an angle at which the second external electronic device 320 is located with respect to the electronic device 200, based on the AoA. According to an embodiment, the processor 220 may identify the angle at which the first external electronic device 310 is located with respect to the electronic device 200 and the angle θ, based on the angle at which the second external electronic device 320 is located with respect to the electronic device 200.

According to an embodiment, the processor 220 may obtain the distance b between the electronic device 200 and the first external electronic device 310, based on a, c-b, and θ. Equations 4 to 8 represent a method of calculating b, based on a, c-b, and θ, using a law of cosines.

$$c^2 = a^2 + b^2 - 2ab\cos\theta \quad \text{[Equation 4]}$$

$$\cos\theta = \frac{a^2 + b^2 - c^2}{2ab} \quad \text{[Equation 5]}$$

$$\beta = c - b \quad \text{[Equation 6]}$$

$$\cos\theta = \frac{a^2 + b^2 - (b+\beta)^2}{2ab} \quad \text{[Equation 7]}$$

$$b = \frac{a^2 - \beta^2}{2a\cos\theta + 2\beta} \quad \text{[Equation 8]}$$

According to an embodiment, the processor 220 may obtain the distance b between the electronic device 200 and the first external electronic device 310, based on Equation 8 above. For example, when a=1, c−b=β=−0.268, and θ=60°, the distance b is as follows.

$$b = \frac{1^2 - (-0.268)^2}{2\cdot 1\cdot \frac{1}{2} + 2\cdot(-0.268)} = \frac{0.928176}{0.464} \doteq 2 \quad \text{[Equation 9]}$$

According to an embodiment, the processor 220 may identify the distance b between the electronic device 200 and the first external electronic device 310 in accordance with the operation described with reference to FIG. 8, and may identify the angle at which the first external electronic device 310 is located with respect to the electronic device 200, based on the AoA of the received advertising frame. That is, the processor 220 may identify the location of the first external electronic device 310 with respect to the electronic device 200.

According to an embodiment, upon determining that the distance b satisfies a specified condition (e.g., within a specified distance) according the disclosure, the processor 220 may perform operations corresponding to the advertising frame transmitted by the first external electronic device 310. For example, the electronic device 200 may output information (e.g., an advertising message) corresponding to the advertising frame, in response to determining that the distance b satisfies the specified condition.

According to various embodiments of the disclosure, the electronic device 200 may identify the location of the first external electronic device 310 with respect to the electronic device 200 in a state where an additional ranging session is not established with the first external electronic device 310 (e.g., an advertiser). For example, the electronic device 200 may identify the distance b with respect to the first external electronic device 310, without having to establish the additional ranging session.

At least some of the operations mentioned as being performed by the electronic device 200 or the processor 220 in the disclosure may be performed (e.g., transferred) by the second external electronic device 320. In addition, at least some of the operations mentioned as being performed by the second external electronic device 320 may be performed (e.g., transferred) by the electronic device 200. According to an embodiment, at least some of the operations mentioned as being performed by the electronic device 200 may be performed together (e.g., in parallel) by the electronic device 200 and the second external electronic device 320. In addition, at least some of the operations mentioned as being performed by the second external electronic device 320 may be performed together (e.g., in parallel) by the second external electronic device 320 and the electronic device 200.

The electronic device according to an example embodiment may include: a communication circuit, and at least one processor, comprising processing circuitry, electrically coupled to the communication circuit. At least one processor, individually and/or collectively, may be configured to: receive via the communication circuit an advertising frame transmitted by the first external electronic device, transmit via the communication circuit a first request signal, requesting a second external electronic device to receive the advertising frame from the first external electronic device, in response to receiving the advertising frame from the first external electronic device, obtain advertisement result response data, including first timestamp information on a timing at which the second external electronic device receives the advertising frame transmitted by the first external electronic device, from the second external electronic device via the communication circuit, obtain location data including location information of the second external electronic device with respect to the electronic device, based on performing ranging using Ultra-Wideband (UWB) communication with the second external electronic device, and identify a location of the first external electronic device with respect to the electronic device, based on the advertisement result response data and the location data.

In the electronic device according to an example embodiment, at least one processor, individually and/or collectively, may be configured to transmit via the communication circuit a second request signal requesting to create the ranging session together with the first request signal, based on receiving the advertising frame from the first external electronic device in a state where a ranging session for performing the ranging is not created.

In the electronic device according to an example embodiment, at least one processor, individually and/or collectively, may be configured to transmit the first request signal through the ranging session and receive the advertisement result response data, based on receiving the advertising frame from the first external electronic device in a state where the ranging session for performing the ranging is created.

In the electronic device according to an example embodiment, at least one processor, individually and/or collectively, may be configured to: receive a first message corresponding to a ranging initiation message from the second external electronic device, using the communication circuit through the ranging session, transmit a second message corresponding to a ranging response message to the second external electronic device, in response to receiving the first message, and receive a third message corresponding to a ranging final message from the second external electronic device.

In the electronic device according to an example embodiment, at least one processor, individually and/or collectively, may be configured to obtain the advertisement result response data, further including second timestamp information on a timing at which the second external electronic device receives the second message, from the second external electronic device via the communication circuit.

In the electronic device according to an example embodiment, at least one processor, individually and/or collectively, may be configured to obtain distance information on a distance between the electronic device and the second external electronic device through a ranging session for performing the ranging. The location data may include the distance information.

In the electronic device according to an example embodiment, at least one processor, individually and/or collectively, may be configured to obtain first angle information on an angle at which the second external electronic device is located with respect to the electronic device, based on an Angle of Arrival (AoA) of a signal received from the second external electronic device through the ranging session. The location data may include the first angle information.

In the electronic device according to an example embodiment, at least one processor, individually and/or collectively, may be configured to: obtain second angle information on an angle at which the first external electronic device is located with respect to the electronic device, based on an AoA of the advertising frame received from the first external electronic device via the communication circuit, and identify the location of the first external electronic device with respect to the electronic device, based on the advertisement result response data, the location data, and the second angle information.

In the electronic device according to an example embodiment, at least one processor, individually and/or collectively, may be configured to: create a plurality of ranging blocks for performing the ranging every specified ranging interval, wherein the plurality of ranging blocks include a first ranging block and a second ranging block, obtain first location data including a location of the second external electronic device with respect to the electronic device for a time duration in which the first ranging block is enabled, obtain second location data including the location of the second external electronic device with respect to the electronic device for a time duration in which the second ranging block is enabled, and identify the location of the first external electronic device with respect to the electronic device, based on either the first location or second location data selected based on the first timestamp information.

A method of operating an electronic device according to an example embodiment may include: receiving an advertising frame transmitted by the first external electronic device, transmitting a first request signal, requesting a second external electronic device to receive the advertising frame from the first external electronic device, to the second external electronic device in response to receiving the advertising frame from the first external electronic device, receiving advertisement result response data, including first timestamp information on a timing at which the second external electronic device receives the advertising frame transmitted by the first external electronic device, from the second external electronic device, obtaining location data including location information of the second external electronic device with respect to the electronic device, based on performing ranging using ultra-wideband (UWB) communication with the second external electronic device, and identifying a location of the first external electronic device with respect to the electronic device, based on the advertisement result response data and the location data.

In the method of operating the electronic device according to an example embodiment, the obtaining of the location data through the ranging session may include: receiving a first message corresponding to a ranging initiation message from the second external electronic device, transmitting a second message corresponding to a ranging response message to the second external electronic device, in response to receiving the first message, and receiving a third message corresponding to a ranging final message from the second external electronic device.

In the method of operating the electronic device according to an example embodiment, the obtaining of the advertisement result response data may include receiving the advertisement result response data further including second timestamp information on a timing at which the second external electronic device receives the second message.

In the method of operating the electronic device according to an example embodiment, the obtaining of the location data may include obtaining distance information on a distance between the electronic device and the second external electronic device through a ranging session for performing the ranging.

In the method of operating the electronic device according to an example embodiment, the obtaining of the location data may include obtaining first angle information on an angle at which the second external electronic device is located with respect to the electronic device, based on an angle of arrival (AoA) of a signal received from the second external electronic device through the ranging session.

In the method of operating the electronic device according to an example embodiment, the method may further include: obtaining second angle information on an angle at which the first external electronic device is located with respect to the electronic device, based on an AoA of the advertising frame received from the first external electronic device. The identifying of the location of the first external electronic device with respect to the electronic device may include identifying the location of the first external electronic device with respect to the electronic device, based on the advertisement result response data, the location data, and the angle information.

An electronic device (e.g., the second external electronic device 320) according to an example embodiment may include: a communication circuit configured to support ultra-wideband (UWB) communication and at least one processor, comprising processing circuitry, electrically coupled to the communication circuit. At least one processor, individually and/or collectively, may be configured to: receive a first request signal, requesting to receive an advertising frame transmitted by a second external electronic device (e.g., the first external electronic device 310), from a first external electronic device (e.g., the electronic device 200) via the communication circuit, create an advertisement reception session in response to receiving the first request signal, receive the advertising frame transmitted by the second external electronic device through the advertisement reception session, and transmit advertisement result response data, including first timestamp information on a timing at which the advertising frame is received, to the first external electronic device via the communication circuit.

In the electronic device according to an example embodiment, at least one processor, individually and/or collectively, may be configured to: receive via the communication circuit a second request signal, requesting to create a ranging session for performing ranging using UWB communication with the first external electronic device, together with the first request signal, and alternately create the ranging session and the advertisement reception session, in response to receiving the first request signal and the second request signal.

In the electronic device according to an example embodiment, at least one processor, individually and/or collectively, may be configured to: transmit a first message corresponding to a ranging initiation message to the first external electronic device, using the communication circuit, through the ranging session, receive a second message corresponding to a ranging response message from the first external electronic device, and transmit a third message corresponding to a ranging final message to the first external electronic device, in response to receiving the second message.

In the electronic device according to an example embodiment, at least one processor, individually and/or collectively, may be configured to: obtain second timestamp information on a timing at which the second message is received from the first external electronic device, and transmit the advertisement result response data further including the second timestamp information to the first external electronic device.

In the electronic device according to an example embodiment, the electronic device may include a wearable electronic device.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a communication circuit;

memory storing instructions; and at least one processor, comprising processing circuitry wherein the instructions, when executed by the at least one processor individually and/or collectively, cause the electronic device to:

receive, via the communication circuit, an advertising frame transmitted by a first external electronic device;

transmit, via the communication circuit, a first request signal, requesting a second external electronic device to receive the advertising frame from the first external electronic device, to the second external electronic device in response to receiving the advertising frame from the first external electronic device;

generate a plurality of ranging blocks for performing ranging, wherein the plurality of ranging blocks includes a first ranging block and a second ranging block;

obtain first location data including a location of the second external electronic device with respect to the electronic device for a time duration in which the first ranging block is enabled, based on performing the ranging with the second external electronic device;

obtain second location data including the location of the second external electronic device with respect to the electronic device for a time duration in which the second ranging block is enabled, based on performing the ranging with the second external electronic device;

obtain, via the communication circuit, response data, including first timestamp information on a timing at which the second external electronic device receives the advertising frame transmitted by the first external electronic device and second timestamp information on a timing at which the second external electronic device receives a second message corresponding to a ranging response message from the electronic device, from the second external electronic device;

identify a location of the first external electronic device with respect to the electronic device by selecting one of the first location data or the second location data as selected location data for the second external electronic device based on which of the first ranging block or the second ranging block a timing corresponding to the first timestamp information is temporally closer to;

calculating a difference between (i) a distance from the first external electronic device to the electronic device and (ii) a distance from the first external electronic device to the second external electronic device, based on the first timestamp information, the second timestamp information, and the selected location data; and determining a location of the first external electronic device based on the difference and the selected location data.

2. The electronic device of claim 1, wherein the instructions, when executed by the at least one processor individually and/or collectively, cause the electronic device to:

based on receiving the advertising frame from the first external electronic device in a state where a ranging session for performing the ranging with the second external electronic device and including the plurality of ranging blocks is not generated, transmit, via the communication circuit, a second request signal, requesting to generate the ranging session together with the first request signal, to the second external electronic device.

3. The electronic device of claim 1, wherein the instructions, when executed by the at least one processor individually and/or collectively, cause the electronic device to based on receiving the advertising frame from the first external electronic device in a state where a ranging session for performing the ranging with the second external electronic device and including the plurality of ranging blocks is generated, transmit the first request signal through the ranging session and receive the response data.

4. The electronic device of claim 1, wherein the instructions, when executed by the at least one processor individually and/or collectively, cause the electronic device to, using the communication circuit through a ranging session for performing the ranging with the second external electronic device and including the plurality of ranging blocks:

receive a first message corresponding to a ranging initiation message from the second external electronic device;

transmit a second message corresponding to a ranging response message to the second external electronic device, in response to receiving the first message; and receive a third message corresponding to a ranging final message from the second external electronic device.

5. The electronic device of claim 1, wherein the instructions, when executed by the at least one processor individually and/or collectively, cause the electronic device to obtain distance information on a distance between the electronic device and the second external electronic device through a ranging session for performing the ranging, and wherein each of the first location data and the second location data includes the corresponding distance information.

6. The electronic device of claim 1, wherein the instructions, when executed by the at least one processor individually and/or collectively, cause the electronic device to obtain first angle information on an angle at which the second external electronic device is located with respect to the electronic device, based on an Angle of Arrival (AoA) of a signal received from the second external electronic device through the ranging session for performing the ranging during the first ranging block and the second ranging block, and wherein each of the first location data and the second location data includes the corresponding first angle information.

7. The electronic device of claim 1, wherein the instructions, when executed by the at least one processor individually and/or collectively, cause the electronic device to:

obtain second angle information on an angle at which the first external electronic device is located with respect to the electronic device, based on an angle of arrival (AoA) of the advertising frame received from the first external electronic device via the communication circuit; and identify the location of the first external electronic device with respect to the electronic device, further based on the second angle information together with the difference and the selected location data.

8. A method of operating an electronic device, the method comprising:

receiving an advertising frame transmitted by a first external electronic device;

transmitting a first request signal, requesting a second external electronic device to receive the advertising frame from the first external electronic device, to the second external electronic device in response to receiving the advertising frame from the first external electronic device;

generating a plurality of ranging blocks for performing ranging, wherein the plurality of ranging blocks includes a first ranging block and a second ranging block;

obtaining first location data including a location of the second external electronic device with respect to the electronic device for a time duration in which the first ranging block is enabled, based on performing the ranging with the second external electronic device;

obtaining second location data including the location of the second external electronic device with respect to the electronic device for a time duration in which the second ranging block is enabled, based on performing the ranging with the second external electronic device;

receiving response data, including first timestamp information on a timing at which the second external electronic device receives the advertising frame transmitted by the first external electronic device and second timestamp information on a timing at which the second external electronic device receives a second message corresponding to a ranging response message from the electronic device, from the second external electronic device;

identifying a location of the first external electronic device with respect to the electronic device by selecting one of the first location data or the second location data as selected location data for the second external electronic device based on which of the first ranging block or the second ranging block a timing corresponding to the first timestamp information is temporally closer to;

calculating a difference between (i) a distance from the first external electronic device to the electronic device and (ii) a distance from the first external electronic device to the second external electronic device, based on the first timestamp information, the second timestamp information, and the selected location data; and determining a location of the first external electronic device based on the difference and the selected location data.

9. The method of claim 8, wherein performing the ranging with the second external electronic device to obtain the first location data and the second location data through a ranging session including the plurality of ranging blocks for performing the ranging comprises:

receiving a first message corresponding to a ranging initiation message from the second external electronic device;

transmitting a second message corresponding to a ranging response message to the second external electronic device, in response to receiving the first message; and receiving a third message corresponding to a ranging final message from the second external electronic device.

10. The method of claim 8, wherein the obtaining of the first location data and the obtaining of the second location data comprise obtaining corresponding distance information on a distance between the electronic device and the second external electronic device through a ranging session for performing the ranging.

11. The method of claim 8, wherein the obtaining of the first location data and the obtaining of the second location data comprise obtaining corresponding first angle information on an angle at which the second external electronic device is located with respect to the electronic device, based on an Angle of Arrival (AoA) of a signal received from the second external electronic device through the ranging session for performing the ranging.

12. The method of claim 8, further comprising obtaining second angle information on an angle at which the first external electronic device is located with respect to the electronic device, based on an angle of arrival (AoA) of the advertising frame received from the first external electronic device, wherein the determining of the location of the first external electronic device with respect to the electronic device comprises determining the location of the first external electronic device with respect to the electronic device, based on the second angle information, the difference, and the selected location data.

13. An electronic device comprising:

a communication circuit supporting ultra-wideband (UWB) communication;

memory storing instructions; and at least one processor comprising processing circuitry, wherein the instructions, when executed by the at least one processor individually and/or collectively, cause the electronic device to:

receive, via the communication circuit, from a first external electronic device, a first request signal requesting the electronic device to receive an advertising frame transmitted by a second external electronic device, generate an advertisement reception session in response to receiving the first request signal, generate a plurality of ranging blocks for performing ranging with the first external electronic device, wherein the plurality of ranging blocks includes a first ranging block and a second ranging block, perform the ranging using UWB communication with the first external electronic device during a time duration in which the first ranging block is enabled and during a time duration in which the second ranging block is enabled, receive, via the communication circuit, the advertising frame transmitted by the second external electronic device through the advertisement reception session, and transmit, via the communication circuit, response data including first timestamp information on a timing at which the advertising frame is received from the second external electronic device and second timestamp information on a timing at which the electronic device receives a second message corresponding to a ranging response message from the first external electronic device, to the first external electronic device.

14. The electronic device of claim 13, wherein the instructions, when executed by the at least one processor individually and/or collectively, cause the electronic device to:

receive, via the communication circuit, a second request signal requesting to generate a ranging session for performing ranging using UWB communication with the first external electronic device, together with the first request signal, and generate the ranging session, including the plurality of ranging blocks, and the advertisement reception session, in response to receiving the first request signal and the second request signal.

15. The electronic device of claim 14, wherein the instructions, when executed by the at least one processor individually and/or collectively, cause the electronic device using the communication circuit through the ranging session for performing the ranging during the plurality of ranging blocks to:

transmit a first message corresponding to a ranging initiation message to the first external electronic device through the ranging session, receive a second message corresponding to a ranging response message from the first external electronic device, and transmit a third message corresponding to a ranging final message to the first external electronic device, in response to receiving the second message.

16. The electronic device of claim 15, wherein the instructions, when executed by the at least one processor individually and/or collectively, cause the electronic device to:

obtain second timestamp information on a timing at which the second message corresponding to the ranging response message is received from the first external electronic device, and transmit, via the communication circuit, the response data including the first timestamp information and the second timestamp information to the first external electronic device.

17. The electronic device of claim 13, wherein the electronic device comprises a wearable electronic device.

* * * * *